United States Patent [19]

Watanabe et al.

[11] Patent Number: 5,032,940
[45] Date of Patent: Jul. 16, 1991

[54] MANUALLY-OPERATED LOADING AND EJECTING MECHANISM FOR A MAGNETIC TAPE CASSETTE APPARATUS

[75] Inventors: Takao Watanabe; Takashi Miyamoto, both of Tokyo, Japan

[73] Assignee: Teac Corporation, Tokyo, Japan

[21] Appl. No.: 340,225

[22] Filed: Apr. 19, 1989

[30] Foreign Application Priority Data

Apr. 27, 1988 [JP] Japan ................................. 63-105261
Apr. 27, 1988 [JP] Japan ................................. 63-105262
Apr. 27, 1988 [JP] Japan ................................. 63-105263

[51] Int. Cl.5 ........................................... G11B 15/24
[52] U.S. Cl. ...................................... 360/96.5; 360/93; 360/96.6; 360/96.3
[58] Field of Search ...................... 360/92-94, 360/96.3-93.6, 137, 60, 99.02, 99.06

[56] References Cited

U.S. PATENT DOCUMENTS

| | | | |
|---|---|---|---|
| 4,489,355 | 12/1984 | Rudi | 360/96.5 X |
| 4,573,091 | 2/1986 | Barton, Jr. et al. | 360/93 X |
| 4,625,248 | 11/1986 | Manning et al. | 360/60 |
| 4,701,817 | 10/1987 | Uemura | 360/96.5 |
| 4,748,526 | 5/1988 | Miyao et al. | 360/128 |

FOREIGN PATENT DOCUMENTS 0125765 11/1984 European Pat. Off. ........... 360/96.5

*Primary Examiner*—Aristotelis M. Psitos
*Assistant Examiner*—Alfonso Garcia
*Attorney, Agent, or Firm*—Woodcock Washburn Kurtz Mackiewicz & Norris

[57] ABSTRACT

A data transfer apparatus has a casing with an entrance slot in which a magnetic tape cassette is to be inserted. Upon full insertion of the cassette to a preassigned standby position, a cassette shift mechanism is activated to transport the cassette from the standby position to a data transfer position opposite a substantially fixed magnetic head. A load/eject lever on the front panel of the casing is to be manually turned following the shifting of the cassette to the data transfer position, in order to cause a pair of drive spindles to move into driving engagement with the hubs of the cassette. Since the drive spindles remain retracted, instead of being automatically sprung into driving engagement with the cassette hubs, unless the load/eject lever is manipulated following the shifting of the cassette to the data transfer position, a cleaning cassette can be used with the apparatus for cleaning the magnetic head without the danger of ruining the drive spindles as a result of forced contact with the cleaning cassette.

8 Claims, 10 Drawing Sheets

MANUALLY-OPERATED LOADING AND EJECTING MECHANISM FOR A MAGNETIC TAPE CASSETTE APPARATUS

BACKGROUND OF THE INVENTION

Our invention relates to apparatus for the transfer (recording and/or reproduction) of data to and/or from magnetic tape packaged in cassette form. More specifically, our invention deals with improvements in data transfer apparatus of the type described and claimed in U.S. Pat. No. 4,701,817 issued Oct. 20, 1987, to Uemura under the same title herewith and assigned to the assignee of our instant application. The data transfer apparatus of our invention is particularly well suited for the storage and retrieval of digitized data, although we do not wish our invention to be limited to this particular application.

In magnetic tape cassette apparatus in general, it is essential that the tape cassette on being loaded therein be precisely positioned with respect to the transducer or magnetic head for proper data transfer therewith. The usual construction of the tape cassette apparatus has been such, however, that the tape cassette on being inserted in the entrance slot of the apparatus is first moved to a preassigned data transfer position. Then the transducer is moved into contact with the tape of the positioned tape cassette preparatory to the commencement of data transfer. Since the tape cassette and the transducer are both independently movable in such apparatus, difficulties have been encountered in some instances in exactly positioning them with respect to each other.

A solution to this problem is found in the above cross-referenced U.S. Pat. No. 4,701,817. This patent makes the movement of the transducer unnecessary; only the tape cassette, on being loaded fully in the apparatus, is moved linearly to the data transfer position opposite the transducer. Then the pair of motor-driven spindles, forming parts of a tape transport, are moved into driving engagement with the hubs of the tape cassette being held in the data transfer position. The movements of the tape cassette to the data transfer position, and of the drive spindles into driving engagement with the cassette hubs, are both automatic, successively taking place upon loading of the tape cassette in the apparatus.

We have found some shortcomings in this prior art apparatus. One is the need for the provision of a complex and bulky tape transport shift mechanism for automatically moving the drive spindles into and out of driving engagement with the cassette hubs. Another shortcoming manifests itself in the use of what is known as the "cleaning cassette" for cleaning the gapped surface of the magnetic head and other required parts of the apparatus.

Such a cleaning cassette is described and claimed in Miyao et al. U.S. Pat. No. 4,748,526. Shaped and sized exactly like the magnetic tape cassette, the cleaning cassette is inserted in the entrance slot of the apparatus like the magnetic tape cassette. Thereupon, also like the tape cassette, the cleaning cassette is automatically transported to the data transfer position, enabling the user to clean the head surface manually by inserting a cleaning stick in a guide passageway defined in the cleaning cassette. The cleaning cassette differs from the tape cassette in having no apertures for admitting the drive spindles. As the drive spindles are thus prevented from moving into the loaded cleaning cassette, so are the usual pair of tape guide pins which are disposed on both sides of the head. The operator can thus manipulate the cleaning stick without interference with the guide pins.

As has been stated, however, the apparatus is so constructed as to automatically actuate the drive spindles into driving engagement with the cassette hubs upon loading of the cassette in the apparatus. Therefore, upon insertion of the cleaning cassette, the drive spindles move into abutment against the bottom wall of the cleaning cassette under spring pressure. Such forced abutment of the drive spindles against the cleaning cassette gives rise to the danger of ruining the spindles or other parts associated therewith.

SUMMARY OF THE INVENTION

We have hereby invented how to simplify the construction of the tape cassette apparatus of the type defined, particularly its tape transport shift mechanism, and consequently how to avoid damage to the drive spindles and associated parts of the apparatus in use of the cleaning cassette.

Briefly, our invention may be summarized as an apparatus for data transfer with a magnetic tape cassette of the type having a housing accommodating a length of magnetic tape for transportation between a pair of hubs rotatably mounted within the housing. The apparatus comprises a casing having defined therein an entrance opening for loading the tape cassette. Mounted within the casing is a cassette shift mechanism for moving the loaded tape cassette to a preassigned data transfer position opposite a transducer. A tape transport shift mechanism is provided which is actuated by a hand-operated member such as a hand lever for moving a pair of drive spindles of a tape transport mechanism into and out of driving engagement with the hubs of the tape cassette being held in the data transfer position.

Thus, according to our invention, the movement of the drive spindles into and out of driving engagement with the cassette hubs is under manual control instead of being automatic as in the prior art. The drive spindles are drivingly engaged with the cassette hubs only when the hand-operated member is manipulated following the shifting of the tape cassette to the data transfer position. The hand-operated member may of course be left untouched when the cleaning cassette is loaded in the apparatus for cleaning the transducer. The drive spindles will then remain retracted and so will be free from destruction as a result of forced abutment against the cleaning cassette having no holes for receiving them.

The above and other features and advantages of our invention and the manner of realizing them will become more apparent, and the invention itself will best be understood, from a study of the following description and appended claims, with reference had to the attached drawings showing a preferable embodiment of the invention.

DESCRIPTION OF THE PREFERRED EMBODIMENT

Figure 1:
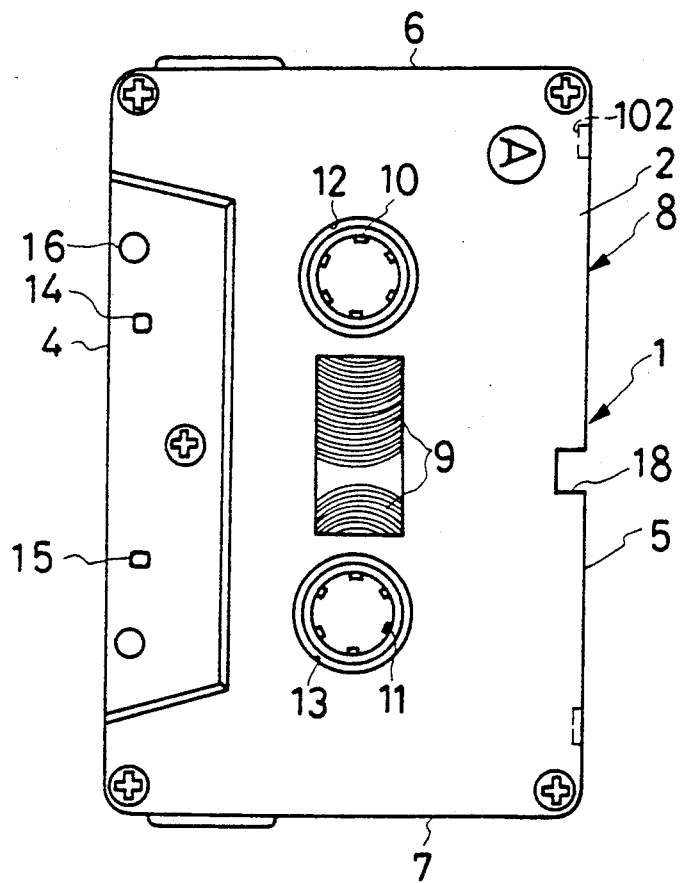
FIG. 1 is a plan view of a magnetic tape cassette for use with the apparatus of our invention.
Figure 2:
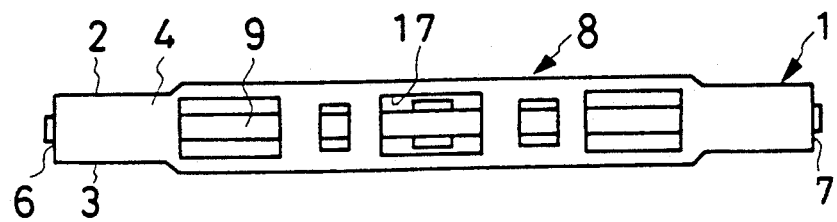
FIG. 2 is a left hand side elevation of the tape cassette of FIG. 1.

We will now describe in detail a preferred form of the improved data transfer apparatus of our invention as adapted for the storage and retrieval of digital data on and from the magnetic tape cassette illustrated in FIGS. 1 and 2. The data transfer apparatus, shown in FIGS. 3-17, broadly comprises a cassette shift mechanism for transporting the loaded tape cassette from standby position to data transfer position, a tape transport mechanism for transporting the magnetic tape of the tape cassette from hub to hub therein, a tape transport shift mechanism for moving the tape transport mechanism into and out of driving engagement with the tape cassette, and a file protect tab detector mechanism for sensing the presence or absence of the file protect tab on the tape cassette. We will describe the tape cassette and the listed mechanisms of the data transfer apparatus under the respective headings and will proceed to the discussion of how the cleaning cassette is used with the apparatus.

Tape Cassette

We will first describe the construction of a magnetic tape cassette for use with the data transfer apparatus of our invention. As illustrated in FIGS. 1 and 2, the tape cassette 1 can be of standard design having a generally flat, boxlike housing 8. This cassette housing has a pair of opposite main surfaces 2 and 3 (referred to as Face A and Face B respectively), a front side 4, a rear side 5, and a pair of lateral sides 6 and 7.

Disposed within the cassette housing 8 are a pair of internally toothed hubs 10 and 11 which are supported between the main faces 2 and 3 of the housing for independent rotation about respective axes in parallel spaced relation to each other. A length of magnetic tape 9 has its opposite extremities anchored to the respective hubs 10 and 11 and is wound thereon for transportation therebetween. The cassette housing 8 has two holes 12 and 13 formed in its main faces 2 and 3 for the passage of the drive spindles, to be set forth presently, of the apparatus into and out of driving engagement with the hubs 10 and 11.

Additionally, the cassette housing 8 has a series of apertures 17, FIG. 2, formed in its front side 4 to partly expose the magnetic tape 9 for data transfer contact with a magnetic transducer head which also is to be set forth presently. Further the cassette housing 8 has defined in its main faces 2 and 3 two holes 14 and 15 for the insertion of guide pins, and an additional hole 16. Ordinarily, the last mentioned hole 16 is intended for the insertion of a capstan employed with the familiar capstan drive cassette players or decks. However, the data transfer apparatus of the invention for use with this tape cassette 1 employs a different principle of tape speed control, so that the hole 16 is to receive a light source for photoelectrically sensing the beginning and end of the magnetic tape 9 (BOT and EOT). A notch 18 is formed in the rear side 5 of the cassette housing 8. Located off the midpoint of the rear side 5 with respect to its longitudinal direction, the notch 18 enables the data transfer apparatus to discriminate between Face A and Face B of the tape cassette 1.

General Construction of Data Transfer Apparatus

Figure 3:
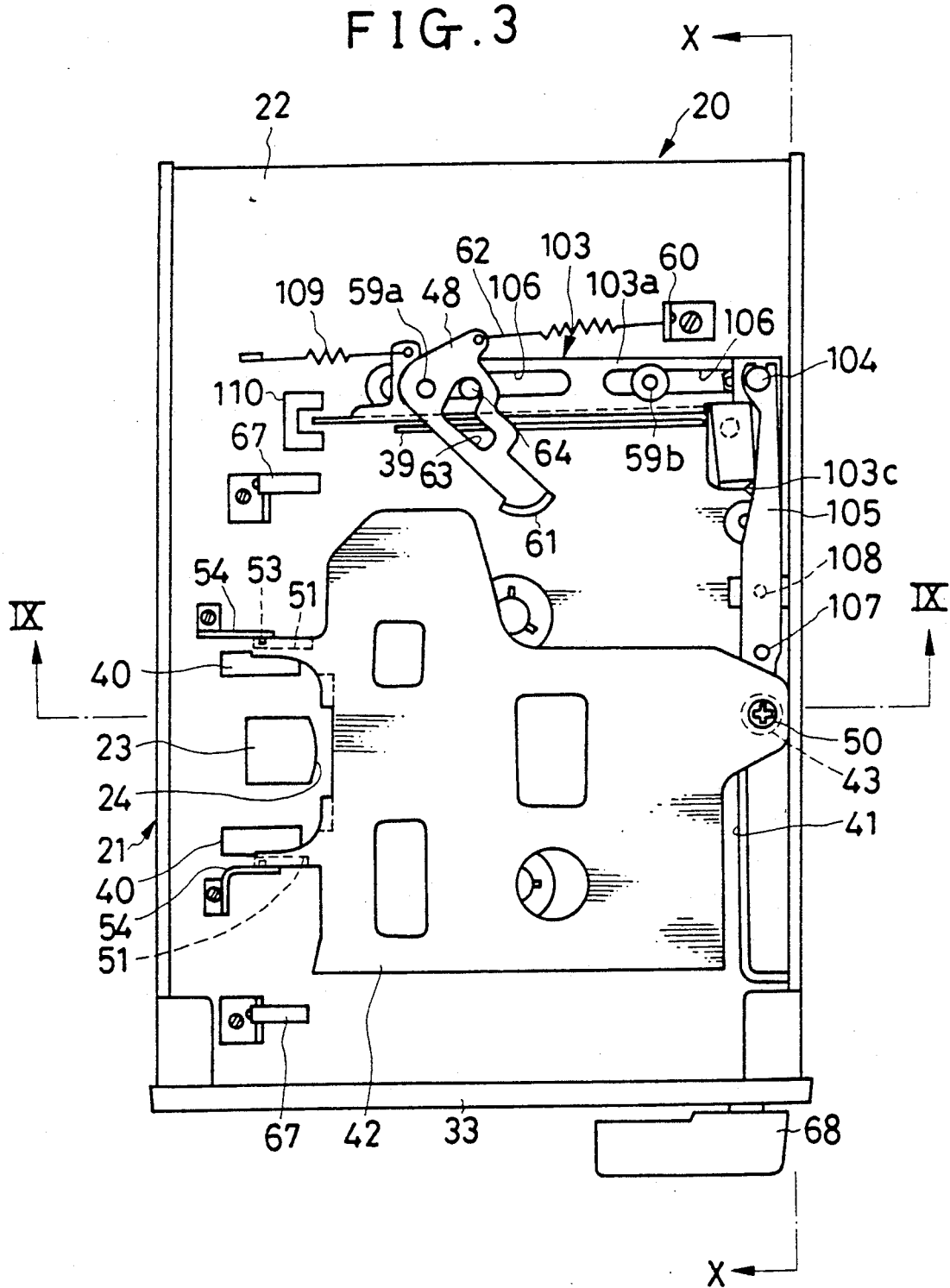
FIG. 3 is a plan view showing the internal construction of the data transfer apparatus constructed in accordance with our invention, the apparatus being shown in the state when not loaded with the tape cassette.

As illustrated in FIG. 3, the data transfer apparatus 20 for use with the tape cassette 1 of the foregoing construction has a housing 21 with a baseplate 22. A transducer or magnetic head 23 is mounted on the baseplate 22. The head 23 has a gapped face 24 for data transfer contact with the magnetic tape 9 of the tape cassette 1. A conventional track select mechanism, not shown, is built into the apparatus 20 for moving the head 23 only in the transverse direction of the tape. No head movement is required in a direction perpendicular to its data transfer surface 24.

Figure 4:
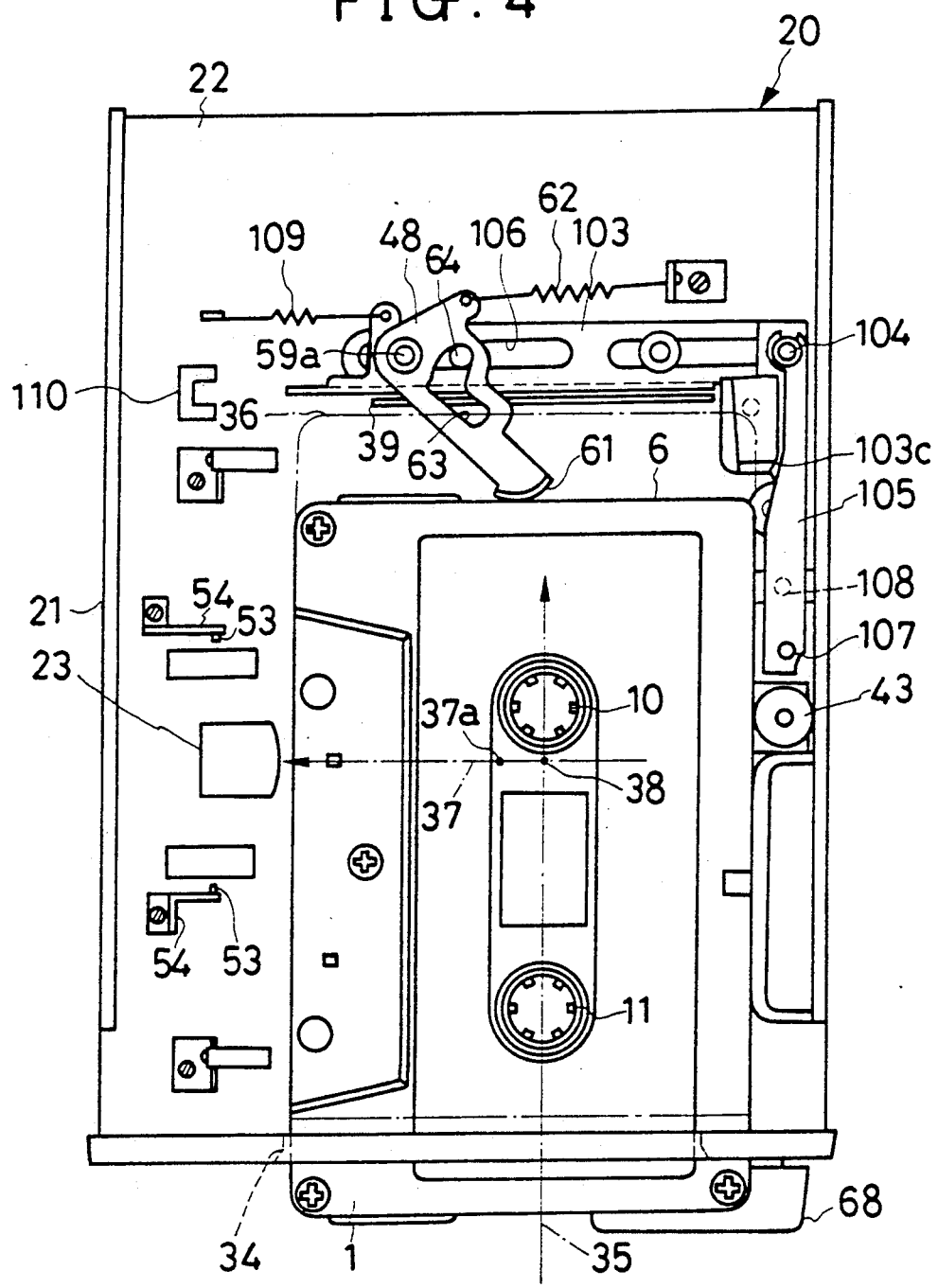
FIG. 4 is a view similar to FIG. 3 except that the shift plate is not shown and that the tape cassette is shown being inserted toward a standby position indicated by the phantom outline.
Figure 5:
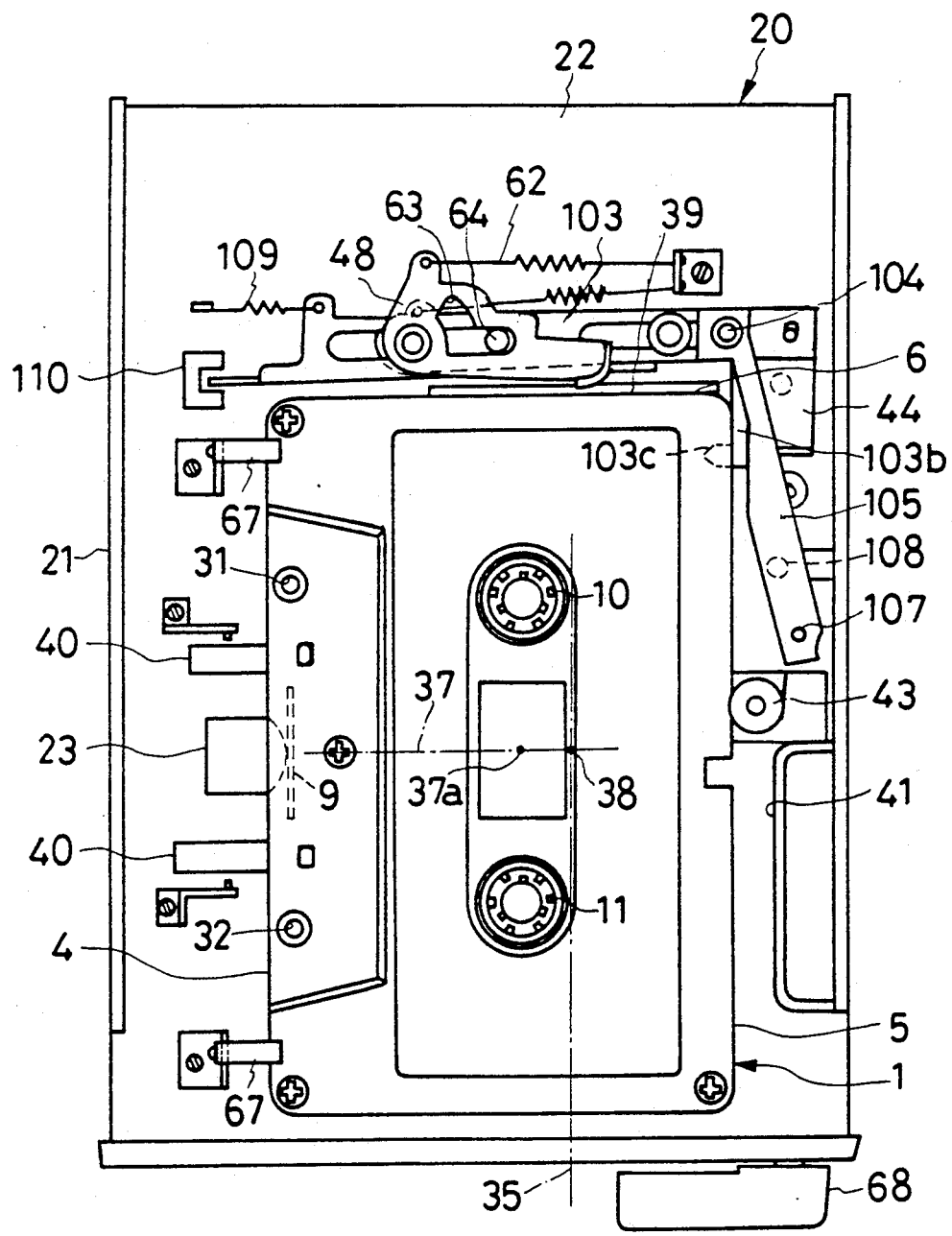
FIG. 5 is a view similar to FIG. 4 except that the tape cassette is shown transported from the standby position to a data transfer position.

FIGS. 4–7 are explanatory of how the tape cassette 1 is loaded in the apparatus 20. FIGS. 4 and 5 show two different positions of the tape cassette 1 being loaded, and FIGS. 6 and 7 correspond respectively to FIGS. 4 and 5. A cassette entrance slot or opening 34 is formed in the front panel 33 of the housing 21 for the insertion and withdrawal of the tape cassette 1.

As clearly indicated in FIG. 4, the tape cassette 1 is to be inserted in the entrance slot 34 along a notional line 35 extending through the centers of the hubs 10 and 11 and in a plane parallel to the baseplate 22. On being so inserted in the entrance slot 34, the tape cassette 1 first occupies a standby position indicated by the phantom outline designated 36 in FIG. 4. From this standby position 36 the tape cassette 1 is to be transported along another notional line 37 at right angles with the first recited notional line 35, to the data transfer position indicated by the solid lines in FIG. 5. In this data transfer position the tape 9 of the cassette 1 comes into contact with the head 23 for data transfer therewith. The tape cassette 1 travels in its own plane, that is, parallel to the baseplate 22, from the standby position to the data transfer position.

The reference numeral 38 in FIG. 4 denotes the crossing point of the notional lines 35 and 37. Let this point 38 be the center (midpoint between the centers of the cassette hubs 10 and 11) of the tape cassette 1 when the latter is in the standby position. Then, as indicated in FIG. 5 the same center of the tape cassette 1 when the latter is in the data transfer position is at the point 37a, slightly displaced to the left, as viewed in FIGS. 4 and 5, from the crossing point 38.

FIGS. 3-5 also show guide and stop means on the baseplate 22 for such right-angular translation of the tape cassette 1. Such means include a lateral stop 39 extending parallel to the direction of cassette displacement between the standby and data transfer positions, a pair of front stops 40 for arresting cassette movement in the data transfer position, and a rear guide 41 for guiding the cassette toward the standby position as the same is inserted in the entrance slot 34. The lateral stop 39 serves the purpose of preventing the tape cassette 1 from being inserted too far into the entrance slot 34.

Cassette Shift Mechanism

Employed for transporting the tape cassette 1 from the standby to the data transfer position is a cassette shift mechanism comprising a cassette shift plate seen at 42 in FIG. 3.

Figure 9:
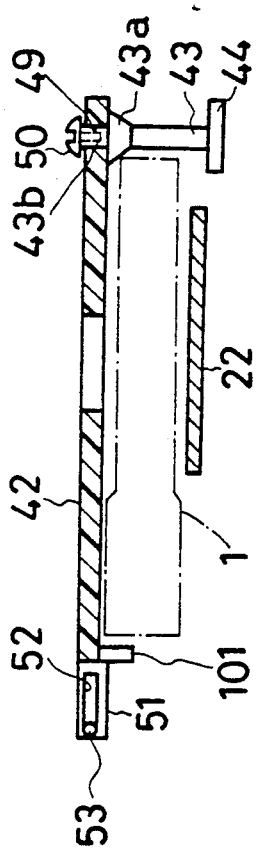
FIG. 9 is a section through the apparatus taken along the line IX—IX in FIG. 3 and showing in particular the means for shifting the tape cassette between the standby and data transfer positions.
Figure 10:
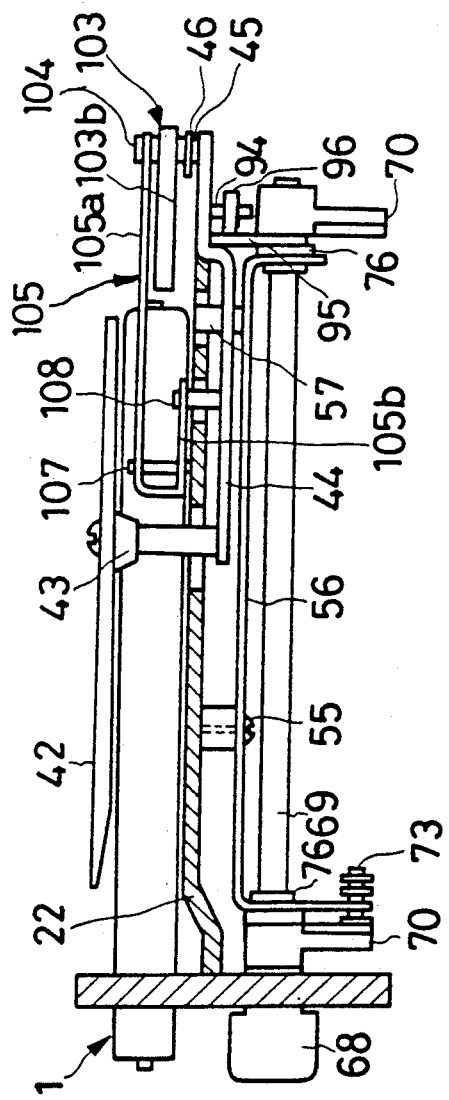
FIG. 10 is a section through the apparatus taken along the line X—X in FIG. 3 and showing in particular the load/eject lever, the cassette shift means, the file protect tab detector means, etc.

As better illustrated in FIGS. 9 and 10, the cassette shift plate 42 is disposed in parallel spaced relation to the baseplate 22 so as to overlie the tape cassette 1 as the same is loaded through the entrance slot. Depending from the shift plate 42 is a pusher pin 43 which has its bottom end coupled to a shift lever 44 seen also in FIGS. 11 and 12. The pusher pin 43 has a head 43a of frustoconical shape with an upward extension 43b rotatably engaged in a hole 49 in the shift plate 42. The pusher pin extension 43b has a tapped hole in which a screw 50 is engaged to prevent detachment of the shift plate 42 from the pusher pin 43.

The shift plate 42 is to travel with the tape cassette 1 between the standby and data transfer positions along the line 37 in FIG. 4. FIGS. 3 and 9 illustrate means for guiding such travel of the shift plate 42. The guide means include a pair of guide pins 53 slidably engaged in grooves 51 formed in a pair of slender arms 52 projecting from the shift plate in coplanar relation therewith. The guide pins 53 are secured to supports 54 which in turn are fastened to the baseplate 22.

As best seen in FIG. 10, the shift lever 44 carrying the pusher pin 43 on one end thereof is medially pivoted at 57 on a fixed support plate 56 which underlies the baseplate 22 and which is screwed as at 55 to the baseplate. Mounted on the other end of the shift lever 44, a pin 45 is slidably engaged in a relatively short slot 46a, FIG. 11, in one end of a thrust member 46. This thrust member 46 is slidable over the baseplate 22 in a direction parallel to the direction of cassette travel between the standby and data transfer positions. A pair of fixed guide pins 59a and 59b on the baseplate 22 are slidably engaged in slots 58a and 58b, respectively, in the thrust member 46 for guiding its travel in the required direction. A helical tension spring 47 has its opposite extremities coupled to the thrust member 46 and a spring retainer 60 on the baseplate 22, acting to bias the thrust member toward the right as viewed in FIGS. 11 and 12.

Figure 11:
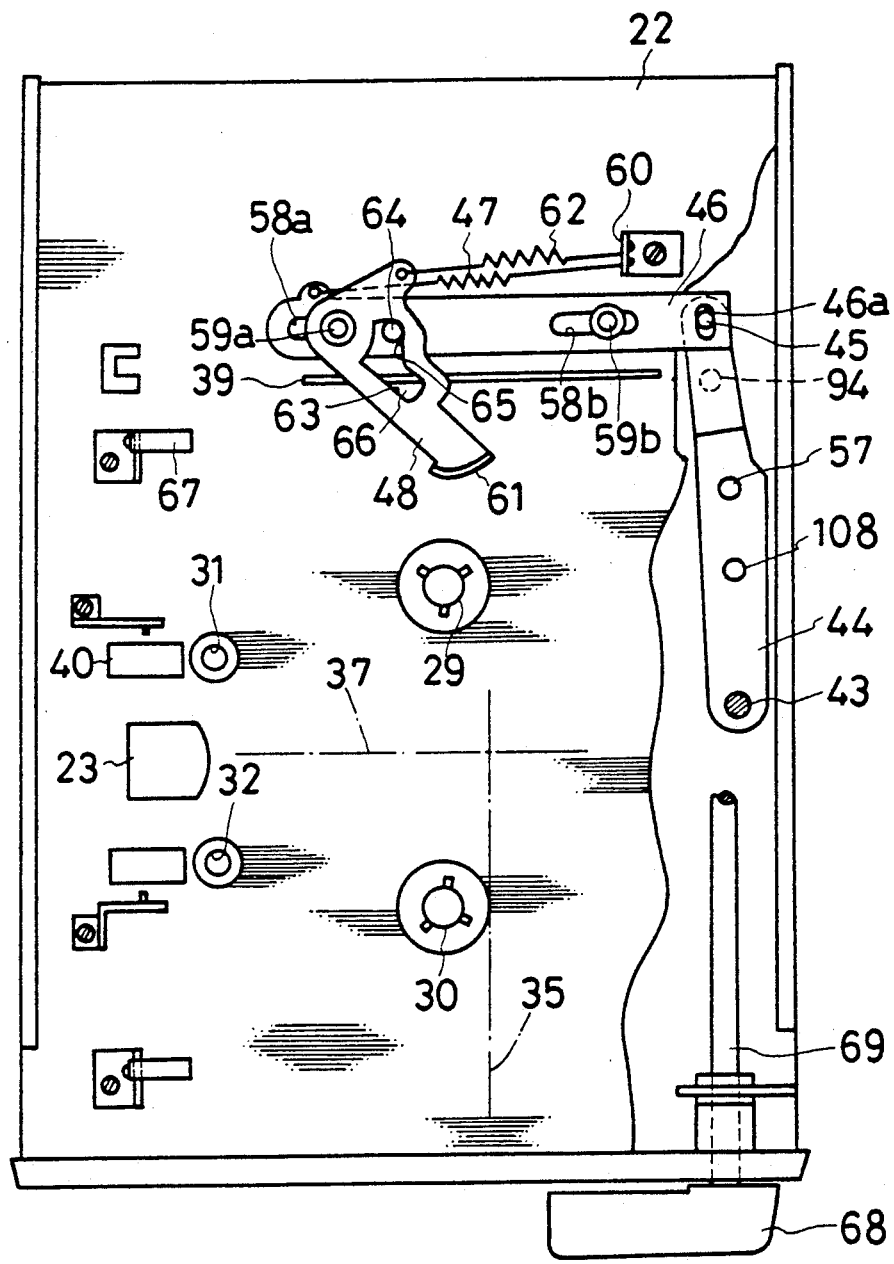
FIG. 11 is a view similar to FIG. 3 but not showing the shift plate, and the file protect tab detector means, and with the baseplate partly broken away to reveal some underlying parts, the apparatus being herein shown in the same state as in FIG. 3.
Figure 12:
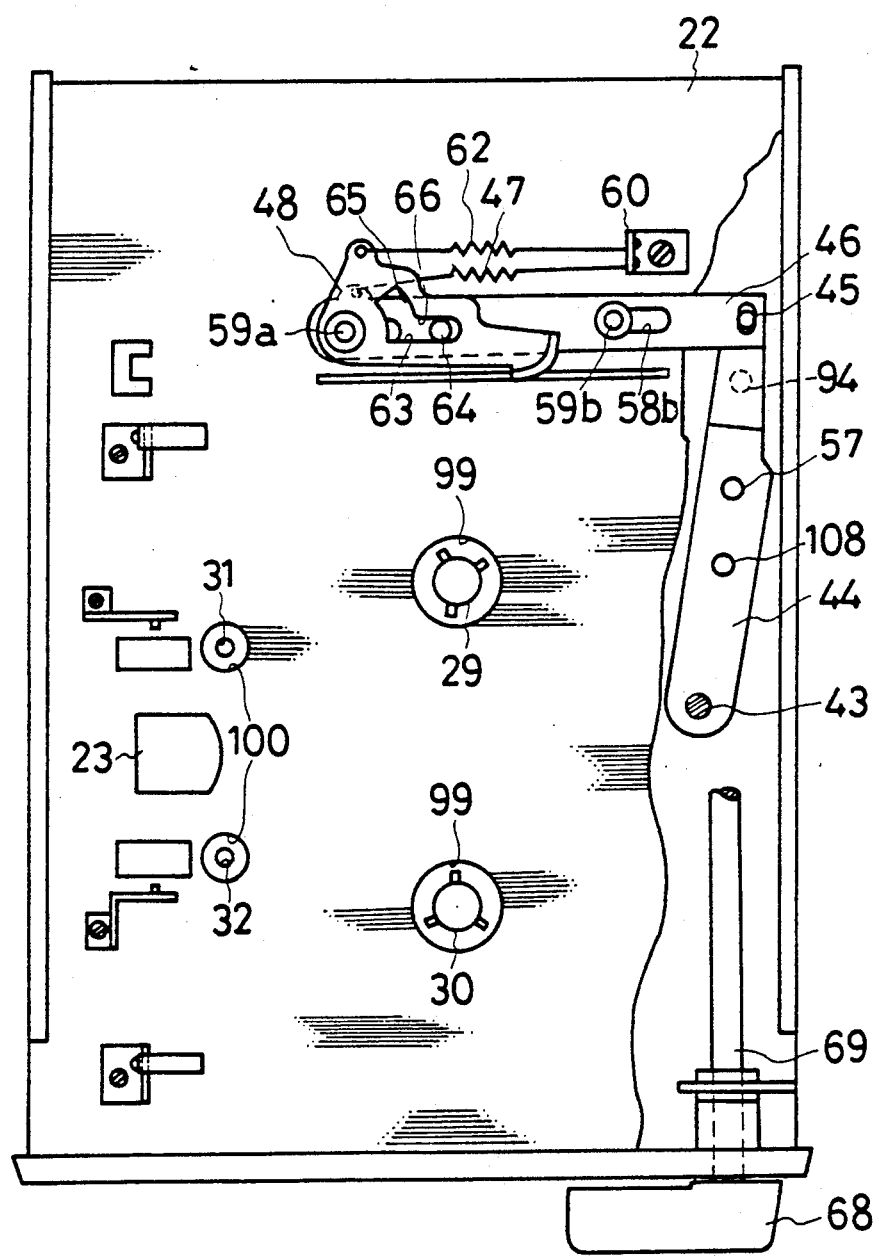
FIG. 12 is a view similar to FIG. 11 except that the apparatus is shown in the same state as in FIG. 5.

FIGS. 11 and 12 also show a cam plate 48 for controlling the linear displacement of the thrust member 46 and, in consequence, the pivotal motion of the shift lever 44. The guide pin 59a for the thrust member 46 doubles as a pivot for the cam plate 48, enabling the same to swing in a plane parallel to the baseplate 22. The cam plate 48 has defined therein a cam slot 63 for slidably receiving a cam follower pin 64 on the thrust member 46. The cam slot 63 has an arcuate portion 65 for holding the thrust member 46 disposed to the left against the force of tension spring 47, and a straight portion 66 for permitting the thrust member to be thrust to the right under the spring force. The cam plate 48 is itself provided with a biasing spring 62, heavier than the thrust member spring 47, whereby the cam plate is normally held in the FIG. 11 position for retaining the thrust member 46 displaced to the left against the bias of the spring 47. An abutment 61 is formed on a distal end of the cam plate 48 for abutting engagement with the tape cassette 1 as the latter is inserted in the entrance slot 34, as depicted in FIG. 4.

For the operational description of the cassette shift mechanism, reference is directed to both FIGS. 3 and 11 which show the normal state of the cassette shift mechanism, that is, the state when the tape cassette is not loaded in the apparatus 20 or has been ejected. The cam plate 48 is pivoted clockwise to its extreme position under the bias of the tension spring 62, receiving the cam follower pin 64 in the arcuate portion 65 of its cam slot 63. Consequently, the thrust member 46 is displaced to the left against the bias of the tension spring 47, so that the shift lever 44 is pivoted counterclockwise to hold the pusher pin 43 away from the magnetic head 23.

Inserted in the entrance slot 34 as in FIG. 4, the tape cassette 1 will hit the abutment 61 on the cam plate 48 and turn the same counterclockwise against the force of the tension spring. By the time the tape cassette 1 reaches the standby position as in FIG. 5, the cam follower pin 64 on the thrust member 46 will enter the straight portion 66 of the cam groove 63, with the consequent displacement of the thrust member to the right under the influence of the tension spring 47, as illustrated in both FIGS. 5 and 12. Thereupon the shift lever 44 will swing in a clockwise direction about its pivot 57. Thus the frustoconical head 43a of the pusher pin 43 on the shift lever 44 will push the tape cassette 1 from the phantom standby position of FIG. 4 to the solid-line data transfer position of FIG. 5.

The tape cassette 1 travels from the standby to the data transfer position, as above, with the shift plate 42 to which the pusher pin 43 is coupled as shown in FIGS. 3, 9 and 10. In the data transfer position, as illustrated in FIG. 5, the tape cassette 1 butts on the pair of front stops 40 on the baseplate 22 and is held against the baseplate by a pair of cantilevered retainer springs 67.

Tape Transport Mechanism

Figure 13:
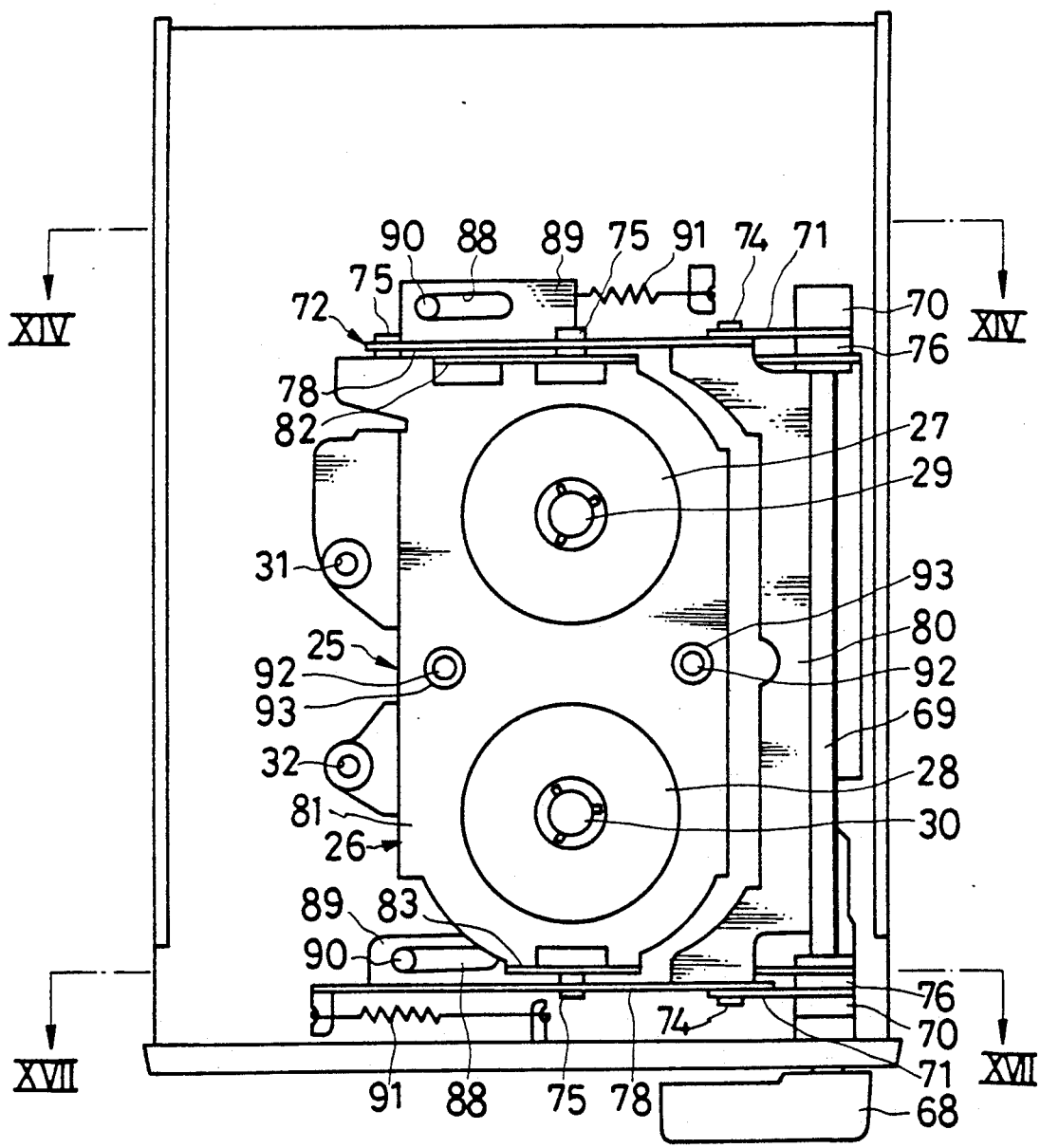
FIG. 13 is a plan view showing the apparatus with the baseplate removed to reveal the underlying tape transport means, and tape transport sift means.

FIG. 13 is an illustration of the tape transport mechanism 25 comprising a pair of upstanding drive spindles 29 and 30 coupled directly to bidirectional electric drive motors 27 and 28, respectively. The drive motors 27 and 28 are both mounted on a support plate or planar carriage 26 laid parallel to the baseplate 22, with the drive spindles 29 and 30 extending perpendicular to the carriage. The noted pair of guide pins 31 and 32 are also mounted perpendicularly on this tape transport carriage 26.

Unlike most prior art data transfer apparatus of this type, the tape transport mechanism 25 is not in fixed relation to the housing 21. Instead, the tape transport mechanism is movable between a retracted position, where the drive spindles 29 and 30 are out of engagement with the tape cassette 1 as in FIGS. 14 and 15, and a working position where the drive spindles are in driving engagement with the hubs 10 and 11 of the tape cassette as in FIG. 16. A tape transport shift mechanism is provided for such movement of the tape transport between the working and retracted positions, as will be detailed subsequently. The tape transport carriage 26 might be considered a part of the tape transport shift mechanism.

The tape transport mechanism 25 does not include the long-familiar combination of capstan and pinch roller for tape speed control. Included in the tape transport mechanism 25 in ther stead is a tape speed sensor roll for sensing the traveling speed of the magnetic tape and controlling the spindle motors 27 and 28 accordingly. However, the tape speed sensor roll is not shown because it has no direct pertinence to our instant application.

Tape Transport Shift Mechanism

According to our invention, the movement of the tape cassette 1 from the standby to the data transfer position does not trip the displacement of the tape transport mechanism 25 from the retracted to the working position. Our invention proposes, instead, the manual shifting of the drive spindles 29 and 30 into driving engagement with the cassette hubs following the movement of the tape cassette to the data transfer position.

Figure 6:
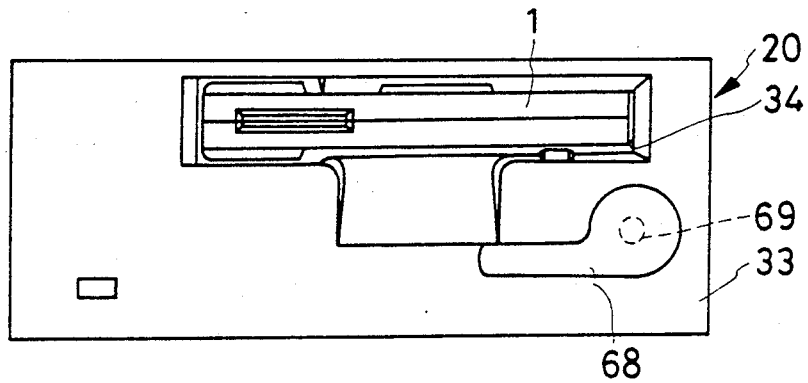
FIG. 6 is a front elevation of the data transfer apparatus, shown in the state when the tape cassette is being inserted in apparatus as in FIG. 4.
Figure 7:
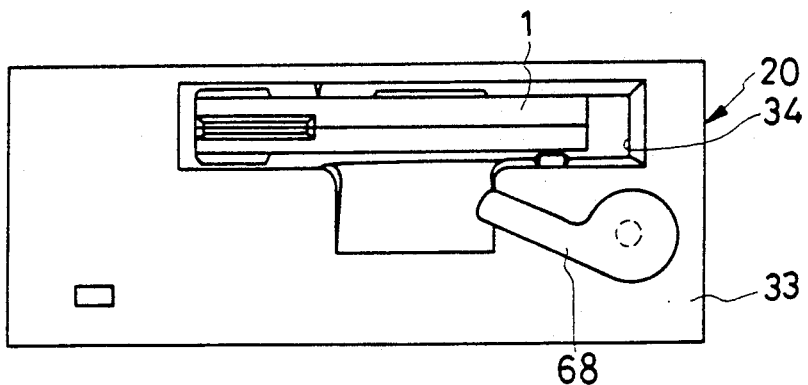
FIG. 7 is a view similar to FIG. 6 but shown in the state when the tape cassette is transported to the data transfer position as in FIG. 5.
Figure 8:
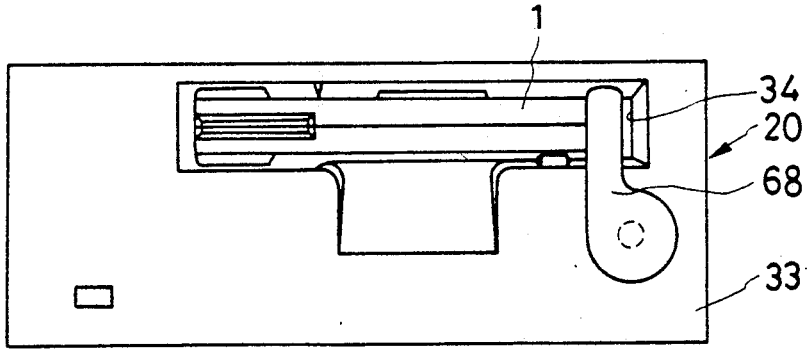
FIG. 8 is also a view similar to FIG. 6 but shown in the state when the drive spindles are moved into driving engagement with the tape cassette.

The manual tape transport shift mechanism comprises a load/eject lever, or any such handle or hand-operated member, seen at 68 in FIGS. 6–8. The load/eject lever 68 is horizontal as in FIG. 6 when the tape cassette 1 is ejected, is slightly angled upwardly as in FIG. 7 when the tape cassette is loaded and shifted to the data transfer position, and is oriented vertically upwardly when the drive spindles are moved into driving engagement with the cassette hubs.

The load/eject lever 68 is mechanically linked to the tape transport carriage 26 as shown in FIGS. 10 and 13-17. The linkage comprises a shaft 69 having the load/eject lever 68 fixedly mounted on one end thereof. Extending parallel to the notional line 35 of FIGS. 4 and 5, the shaft 69 is rotatably mounted via a pair of bearings 76 to the fixed support plate 56 underlying the baseplate 22. A pair of crank arms 70 are rigidly mounted on the opposite ends of the rotatable shaft 69. The crank arms 70 have their distal ends pin-jointed at 73 to links 71 having slots 77 formed therein. These slots 77 slidably receive a pair of pins 74 on the opposite ends of a tape transport shift cam 72.

As will be understood from FIG. 13, the tape transport shift cam 72 is a one-piece construction of a web 80 laid parallel to the baseplate 22, and a pair of flanges 78 bent right-angularly from the opposite ends of the web.

The pair of pins 74 are formed on the respective flanges 78 of the tape transport shift cam 72.

FIG. 13 also indicates that the tape transport carriage 26 similarly comprises a web 81 laid parallel to the baseplate 22, and a pair of flanges 82 and 83 bent right-angularly from the web 81. The flange 82 of the carriage 26 has two cam follower pins 75 formed thereon, whereas the other flange 83 has but one cam follower pin 75 formed thereon. All these cam follower pins 75 are slidably engaged in cam slots 87 in the pair of flanges 78 of the tape transport shift cam 72. Each cam slot 87 has a slanting portion 84 having its opposite ends joined to a pair of horizontal portions 85 and 86.

FIG. 13 further illustrates a pair of fins 89 formed integral with the tape transport shift cam 72 at its opposite ends. The fins 89 have formed therein slots 88 each extending in the direction of the notional line 37 in FIG. 4. The slots 88 slidably receive fixed guide pins 90 on the baseplate 22. It is thus seen that the tape transport shift cam 72 is constrained to linear reciprocation along the notional line 37, that is, in the direction of cassette travel between the standby and data transfer positions. A pair of helical tension springs 91 biases the tape transport shift cam 72 away from the magnetic head 23.

The tape transport carriage 26 is also provided with guide means for displacement only in the direction perpendicular to the baseplate 22. Such guide means include a pair of guide pins 92, FIG. 13, erected on the baseplate 22 and slidably received in holes 93 in the tape transport carriage 26.

Figure 14:
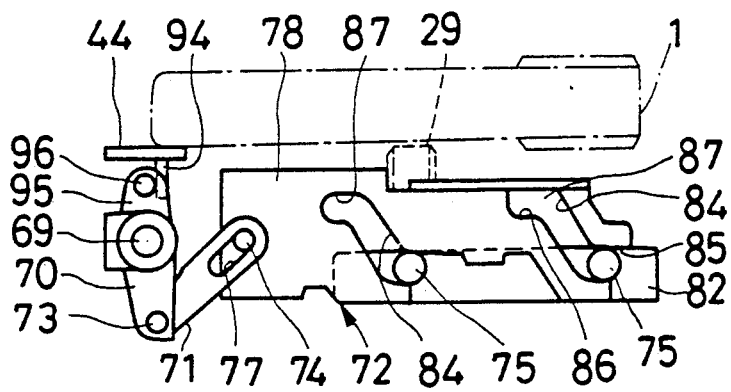
FIG. 14 is a section through the apparatus taken along the line XIV—XIV in FIG. 13 and showing in particular the tape transport shift means in the same state as in FIGS. 4 and 6.
Figure 15:
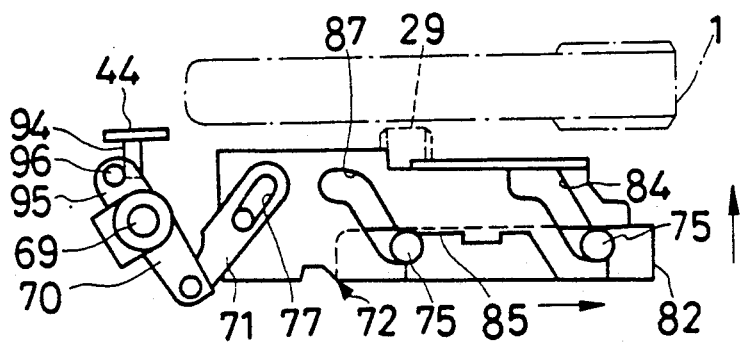
FIG. 15 is a view similar to FIG. 14 except that the tape transport shift means is shown in the same state as in FIGS. 5 and 7.

As the name implies, the load/eject lever 68 is used not only for shifting the tape transport mechanism 25 between the working and retracted positions but also for ejecting the tape cassette 1 following a desired run of data transfer operation. Toward this end, as illustrated in FIGS. 10, 14 and 15, the rotary shaft 69 has an additional crank arm 95 extending therefrom and terminating in a pin 96. This pin 96 engages another pin 94 depending from the shift lever 44 of the cassette shift mechanism.

Figure 17:
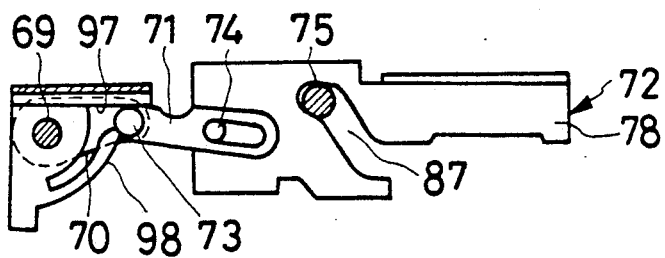
FIG. 17 is a section through the apparatus taken along the line XVII—XVII in FIG. 13 and also showing the tape transport shift means in the same state as in FIG. 16.

FIG. 17 best illustrates means for stably maintaining the load/eject lever 68 in the angular position of FIG. 8 during the progress of data transfer. Included in such means are a stop 97 and a resilient retainer arm 98 of arcuate shape, both formed in one piece with the fixed support plate 56 best seen in FIG. 10. The pivot pin 73 on one of the pair of cranks arms 70 on the rotary shaft 69 is to travel along the resilient retainer arm 98 as the load/eject lever 68 is turned, and is to be captured between the tip of the retainer arm and the overlying stop 97 when the load/eject lever reaches the FIG. 8 position, that is, when the drive spindles 29 and 30 are moved into driving engagement with the cassette hubs.

The following is the operational description of the tape transport shift mechanism. The cassette shift lever 44 swings clockwise from its FIG. 11 position to that of FIG. 12 with the travel of the tape cassette 1 from the phantom standby position of FIG. 4 to the solid-line data transfer position of FIG. 5. Thereupon, as illustrated in FIG. 15, the pin 94 depending from the shift lever 44 pushes the pin 96 on the crank arm 95 thereby causing the shaft 69 to revolve counterclockwise until the load/eject lever 68 turns from its FIG. 6 position to that of FIG. 7.

Incidentally, if it is now desired to eject the loaded tape cassette 1 for some reason or other, the load/-eject lever 68 may be turned counterclockwise back to the FIG. 6 position.

Figure 16:
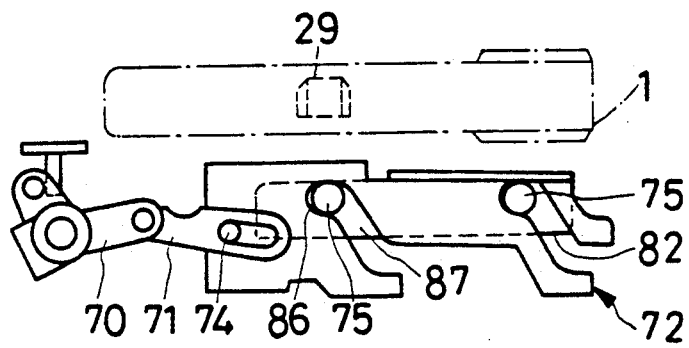
FIG. 16 is also a view similar to FIG. 14 except that the tape transport shift means is shown in the state when the drive spindles are moved into driving engagement with the tape cassette.

Following the transfer of the tape cassette 1 to the data transfer position of FIG. 5, the load/eject lever 68 may be turned clockwise to the FIG. 8 position. FIGS. 16 and 17 show the resulting angular position of the pair of crank arms 70 on the rotary shaft 69. A comparison of these figures with FIG. 15 will reveal that the slotted links 71 have simultaneously turned clockwise and moved rightward with the angular displacement of the crank arms 70. Thus the angular motion of the shaft 69 has been translated into the linear displacement of the tape transport shift cam 72. Such linear displacement of the tape transport shift cam 72 results, in turn, in the linear displacement of the tape transport carriage 26 away from the baseplate 22 as guided by the upstanding guide pins 92 thereon, as the three cam follower pins 75 on the carriage relatively slide up the slanting portions 84 of the cam grooves 87. The cam follower pins 75 will enter the upper horizontal portions 86 of the cam grooves 87 as the load/eject lever 68 is turned until the pivot pin 73 on one of the crank arms 70 come to butt on the stop 97.

Upon hitting the stop 97 as in FIGS. 16 and 17, the pivot pin 73 will be retained in position by the tip of the resilient retainer arm 98 in order to stably maintain the load/eject lever 68 in the FIG. 8 position. Preferably, the tip of the retainer arm 98 may be appropriately rounded for ready disengagement of the pivot pin 73 when the load/eject lever 68 is subsequently turned back from its FIG. 8 position toward that of FIG. 6.

The above explained linear displacement of the tape transport carriage 26 away from the baseplate 22 results in the movement of the drive spindles 29 and 30 into driving engagement with the hubs 10 and 11 of the tape cassette 1 through holes 99, FIG. 12, in the baseplate 22. The pair of guide pins 31 and 32 will also move up through holes 100 in the baseplate 22 into holes 14 and 15, FIG. 1, in the tape cassette 1. The tape cassette is now ready for the commencement of data transfer with the magnetic head 23.

For ejecting the tape cassette 1, the load/eject lever 68 may be turned counterclockwise from its FIG. 8 to FIG. 7 position. Thereupon the pair of crank arms 70 on the rotary shaft 69 will turn clockwise, and the pair of links 71 counterclockwise, from their FIGS. 16 and 17 positions. The tape transport shift cam 72 will then travel to the right as viewed in FIG. 13 (to the left as viewed in FIGS. 16 and 17) under the bias of the return spring 91 seen in FIG. 13. In so doing the tape transport shift cam 72 will act on the cam follower pins 75 to depress the tape transport carriage 26 as in FIG. 15. Thus the drive spindles 29 and 30 and guide pins 31 and 32 will descend out of engagement with the tape cassette 1.

Upon subsequent turn of the load/eject lever 68 from its FIG. 7 to FIG. 6 position, the pin 96 on the additional crank arm 95 on the rotary shaft 69 will push the pin 94 on the cassette shift lever 44 to the right as viewed in FIG. 15 (to the left as viewed in FIG. 12). Consequently, swung counterclockwise as viewed in FIG. 8, the shift lever 44 will return to the FIG. 11 position together with the pusher pin 43 thereon thereby setting the tape cassette 1 free from the force that has been holding the same in the data transfer position as in FIG. 5. As the shift plate 42, screwed to the pusher pin 43, also returns to the FIG. 3 position with the shift lever 44, the tape cassette will travel with the shift plate from the solid-line data transfer position of FIG. 5 to the phantom standby position of FIG. 4 as a pusher 101, FIG. 9, depending from the shift plate 42 engages the front edge of the tape cassette.

As the shift lever 44 is turned as aforesaid in a counterclockwise direction with the turn of the load/eject lever 68 from its FIG. 7 to FIG. 6 position, the thrust member 46 will travel to the left as viewed in FIG. 12. When the tape cassette 1 reaches the phantom stand-by position of FIG. 4, the cam follower pin 64 on the thrust member 46 will leave the straight portion 66 of the slot 63 in the cam plate 48 and enter its arcuate portion 65. Thereupon, pivoted clockwise under the bias of the tension spring 62, the cam plate 48 will push the tape cassette 1 from the phantom standby position of FIG. 4 to the ejected position indicated by the solid lines in the same drawing, in which the tape cassette partly projects out of the entrance slot 34. The thrust member 46 will remain in the FIG. 11 position against the bias of the tension spring 47 even after the operator has released the load/eject lever 68, because the cam follower pin 64 on the thrust member is caught in the arcuate portion 65 of the cam slot 63.

File Protect Tab Detector Mechanism

As illustrated in FIG. 1, the tape cassette 1 has a file protect tab 102 on its rear side 5, which is to be removed for protection of the stored data against inadvertent erasure. The data transfer apparatus 20 comprises a file protect tab detector mechanism in order to determine the presence or absence of the file protect tab 102 when the tape cassette 1 is loaded.

With reference to FIGS. 3-5 and 10 the file protect tab detector mechanism comprises a photocoupler 110 immovably mounted on the baseplate 22, a sensor member 103 movable into the photocoupler in the absence of the file protect tab 102 on the loaded tape cassette 1, and a reset arm 105 pin-jointed at 104 to the sensor member 103. The sensor member 103 is generally L-shaped as seen in a plan view as in FIGS. 3-5, comprising a first portion 103a extending parallel to the notional line 35. The first portion 103a has two aligned slots formed therein for slidably receiving fixed pins 59a and 59b, respectively. Consequently, the sensor member 103 is constrained to linear displacement only in the direction parallel to the notional line 37.

The second portion 103b of the sensor member 103 is concealed behind the reset arm 105 in FIGS. 3-5 but fully appears in FIG. 10. This second portion 103b has a tip 103c bent toward the standby and data transfer positions of the tape cassette 1 for detecting the presence or absence of the file protect tab 102.

FIG. 10 also reveals that the reset arm 105 is in the shape of a recumbent U and is pivoted on a pin 107 erected on the baseplate 22. The upper part 105a of the reset arm 105 has its distal end bifurcated, as in FIG. 3, for slidably engaging a pin 104 by way of operative connection to the sensor member 103. The lower part 105b of the reset arm 105 has its distal end coupled to a pin 108 on the shift lever 44. The sensor member 103 is urged toward the photocoupler 110 by a helical tension spring seen at 109 in FIGS. 3-5.

The operation of the file protect tab detector tab detector mechanism is as follows. The shift lever 44 turns as aforesaid in a clockwise direction about its pivot 57 from its FIG. 11 position to that of FIG. 12 when the tape cassette 1 is transported from the phantom standby position of FIG. 4 to the solid-line data transfer position of FIG. 5. Being pinned at 108 to the shift lever 44 as in FIG. 10, the reset arm 105 will turn counterclockwise as seen in FIGS. 4 and 5, with the sensor member 103 traveling to the left under the bias of the tension spring 109. The tip 103c of the sensor member portion 103b will then come to butt on the file protect tab 102, if any, on the rear side of the tape cassette 1. If the file protect tab has been removed, on the other hand, then the sensor member tip 103c will enter the resulting recess created in the rear side of the tape cassette.

Thus the degree of leftward displacement of the sensor member 103 with respect to the photocoupler 110 will vary depending upon whether the file protect tab is present on or absent from the loaded tape cassette 1. The photocoupler 110 will provide an electric output indicative of the presence or absence of the file protect tab.

How to Use the Cleaning Cassette

The cleaning cassette, not shown, suggested by the noted Miyao et al. U.S. Pat. No. 4,748,526 may be inserted in the entrance slot 34 of this data transfer apparatus 20 just like the tape cassette 1. Also as in the case of the loading of the tape cassette, the load/eject lever 68 will turn to the FIG. 7 position when the cleaning cassette is automatically transported from the phantom standby position of FIG. 4 to the solid-line data transfer position of FIG. 5.

As long as the load/eject lever 68 is left in the FIG. 7 position, the tape transport mechanism will remain retracted, so that the drive spindles will not be ruined by being forced against the bottom surface of the cleaning cassette. The gapped face of the magnetic head 23 can be cleaned by inserting a cleaning stick, not shown, in the guide passageway in the cleaning cassette as the guide pins 31 and 32 also remain retracted.

Upon completion of the cleaning operation the load/eject lever 68 may be manually turned from the FIG. 7 back to the FIG. 6 position. The cleaning cassette will be ejected through the procedure that has been set forth in connection with the tape cassette 1.

Advantages

Among the advantages gained by the data transfer apparatus 20 of the foregoing construction are:

1. The tape transport mechanism remains retracted when the tape cassette 1 travels to the data transfer position, unless the load/eject lever 68 is manually turned to the FIG. 7 position, so that the drive spindles 29 and 30 are protected from destruction as a result of forced contact with the cleaning cassette.

2. The tape transport shift mechanism is materially simplified in construction because of the manual shifting of the tape transport.

3. The invention requires the expenditure of much less manual effort in turning the load/eject lever for cassette ejection than the prior art in which the tape transport is sprung into driving engagement with the tape cassette.

4. The tape cassette can be readily loaded in and unloaded from the apparatus 20 by turning a lever, which requires much less force than a push button for doing the same work.

5. The use of the same lever for the shifting of the tape transport between the working and retracted positions and for the ejection of the tape cassette assures the execution of the two operations in a well timed sequence.

6. The load/eject lever indicates by its own angular positions the various possible working states of the apparatus.

7. The load/eject lever can be turned to the FIG. 8 position for shifting the tape transport to its working position only after the tape cassette has been completely inserted in the entrance slot.

8. The shift lever 44 is used not only for shifting the tape cassette from the standby to the data transfer position but also for actuating the file protect tab detector mechanism by the spring 109, as well as for association with the rotary shaft 69 via the pin 94, so that all such different mechanisms are closely interrelated for proper functioning.

9. The superposed arrangement of the thrust member 46 and the file protect tab sensor member 103 not only makes possible the sharing of the guide pins 59a and 59b but also saves installation space.

10. The pusher pin 43 engages the tape cassette by its frustoconical head 43a, stably pushing the same from the standby to the data transfer position by partly urging the cassette against the baseplate 22.

11. Highly simplified and compact guide means 51, 52, 54 and 54 are used for guiding the linear motion of the shift plate 42 with the tape cassette 1.

12. As illustrated in FIG. 17, the pivot pin 73 butts on the stop 97 when the arm 70 is turned to such an extent that the center of the pivot pin 73 travels somewhat beyond a line extending between the center of the rotary shaft 69 and the center of the pin 74 on the tape transport shift 72. Consequently, the force of the tension spring 91, FIG. 13 can be utilized for urging the pivot pin 73 against the stop 97 in order to stably hold the arm 70 and other associated parts in the required positions.

13. The load/eject lever 68 is positively retained in the FIG. 17 position as the pivot pin 73 is captured between the stop 97 and the tip of the resilient arm 98 as in FIG. 17. Also, when the lever is fully turned to that position, the operator can sense the fact both audibly and by the feel of the hand.

14. The complete tape transport mechanism 25 including the pair of guide pins is compactly mounted on the tape transport carriage 26 for joint movement between the working and retracted positions under manual control.

Possible Modifications

Although we have shown and described our invention in terms of but one preferable embodiment thereof, we do not wish our invention to be limited by the exact details of that embodiment. A variety of modifications, alterations or adaptations will readily occur to one skilled in the art within the broad teaching hereof. For example:

1. The shift plate 42 could be replaced by a planar carriage mounted on the baseplate 22 so as to underlie the loaded tape cassette, or by a boxlike carriage capable of receiving the cassette.

2. The load/eject lever 68 could be wholly or partly received in a recess formed in the front panel of the apparatus.

3. The tape cassette could be manually activated for movement from the standby to the data transfer position.

4. Only the drive spindles could be moved into and out of driving engagement with the tape cassette, instead of together with the drive motors.

5. The load/eject lever could be replaced by a push button or other hand-operated member.

6. The invention might be adapted for application to data transfer apparatus of the type having the familiar combination of a capstan and a pinch roller.

What we claim is:

1. An apparatus for data transfer with a magnetic tape cassette of the type having a housing accomodating a length of magnetic tape for transportation between a pair of hubs rotatably mounted within the housing, the apparatus comprising:
   (a) a casing having defined therein an entrance opening for loading the tape cassette;
   (b) a cassette shift means for moving the loaded tape cassette to a preassigned data transfer position;
   (c) a transducer positioned within the casing for data transfer within the casing for data transfer with the tape cassette being held in the data transfer position;
   (d) a hand lever on the casing;
   (e) tape transport means having a pair of drive spindles movable into and out of driving engagement with the hubs of the tape cassette being held in the data transfer position;
   (f) tape transport carriage for mounting the tape transport means wherein said tape transport means being constrained to linear reciprocation relative to the casing in a first direction for carrying the drive spindles into and out of driving engagement with the hubs of the tape cassette in the data transfer position; and
   (g) tape transport shift means actuated by the hand lever for shifting the drive spindles into and out of driving engagement with hubs of the tape cassette, the tape transport shift means comprising;
   (1) rotary shaft coupled to the hand lever thereby to be rotated;
   (2) a tape transfer shift cam constrained to linear reciprocation relative to the casing in a second direction at right angles with the first direction;
   (3) means for translating the rotation of the rotary shaft into the linear motion of the tape transport shift cam; and
   (4) cam follower means formed on the tape transport carriage and engaged with the tape transport shift cam for causing the displacement of the tape transport carriage in the first direction in response to the displacement of the tape transport shift cam in the second direction.

2. The data transfer apparatus of claim 1 wherein the tape transport shift means further comprises resilient means biasing the tape transport shift cam in a direction for causing the movement of the drive spindles out of driving engagement with the hubs of the tape cassette.

3. The data transfer apparatus of claim 1 wherein the translating means comprises:
   (a) a crank arm on the rotary shaft;
   (b) a link pivotally joined to the crank arm and having a slot formed therein; and
   (c) a pin formed on the tape transport shift cam and slidably engaged in the slot in the link.

4. The data transfer apparatus of claim 3 wherein the crank arm and the link are joined together via a pivot pin, and wherein the apparatus further comprises a stop in fixed relation to the casing for arresting the rotation of the crank arm in a direction for moving the drive spindles into driving engagement with the hubs of the tape cassette when the center of the pivot pin travels past a straight line connecting the axis of the rotary shaft and the center of the pin on the tape transport shift cam.

5. The data transfer apparatus of claim 4 further comprising a resilient retainer arm of arcuate shape along which the pivot pin travels with the rotation of the rotary shaft, the retainer arm being effective to yieldably retain a pivot pin against the stop.

6. An apparatus for data transfer with a magnetic tape cassette of the type having a generally flat boxlike housing accommodating a length of magnetic tape for transportation between a pair of hubs mounted within the housing for independent rotation about respective axes in parallel spaced relation to each other, the tape being exposed through an aperture in a predetermined front side of the housing extending parallel to a notional line right-angularly intersecting the axes of the hubs, the apparatus comprising:
   (a) a casing having defined therein an entrance opening through which the tape cassette is to be inserted into the casing in the direction of the notional line right-angularly crossing the axes of the hubs of the tape cassette, the tape cassette lying in a preassigned standby position within the casing upon full insertion therein through the entrance opening;
   (b) a transducer mounted within the casing and having a data transfer surface so oriented as to confront the apertured front side of the housing of the tape cassette lying in the standby position;
   (c) cassette shift means responsive to full insertion of the tape cassette in the entrance opening for moving the tape cassette in its principle plane from the standby position to a data transfer position in a direction normal to the notional line, the tape cassette when in the data transfer position having the magnetic tape held against the data transfer surface of the transducer for the data transfer therewith through the apertured front side of the housing cassette;
   (d) a hand lever on the casing;
   (e) tape transport means having a pair of drive spindles movable into and out of driving engagement with the hubs of the tape cassette being held in the data transfer position;
   (f) tape transport carriage for mounting tape transport means wherein said tape transport carriage being constrained to linear reciprocation relative to the casing in a first direction for carrying the drive spindles into and out of the driving engagement with the hubs of the tape cassette in the data transfer position; and
   (g) tape transport shift means actuated by the hand lever for shifting the drive spindles into and out of the drive engagement with the hubs of the tape cassette, the tape transport shift means comprising;
   (1) rotary shaft coupled to the hand lever thereby to be rotated;
   (2) a tape transport shift cam constrained to linear reciprocation relative to the casing in a second direction at right angles with the first direction;
   (3) means for translating the rotation of the rotary shaft into the linear motion of the tape transport shift cam; and
   (4) cam follower means formed on the tape transport carriage and engaged with the tape transport shift cam for causing the displacement of the tape transport carriage in the first direction in the response to the displacement of the tape transport shift cam in the second direction.

7. An apparatus for data transfer with a magnetic tape cassette of the type having a generally flat boxlike housing accommodating a length of magnetic tape for transportation between a pair of hubs mounted within the housing for independent rotation about respective axes in parallel spaced relation to each other, the tape being exposed through an aperture in a predetermined front side of the housing extending parallel to a notional line right-angularly intersecting the axes of the hubs, the apparatus comprising:
- (a) a casing having defined therein an entrance opening through which the tape cassette is to be inserted into the casing in the direction of the notional line right-angularly crossing the axes of the hubs of the tape cassette, the tape cassette lying in a preassigned standby position within the casing upon full insertion therein through the entrance opening;
- (b) a transducer mounted within the casing and having a data transfer surface so oriented as to confront the apertured front side of the housing of the tape cassette lying in the standby position;
- (c) a hand-operated control member on the casing having first, second and third working positions, the control member being held in the first working position when the apparatus is not loaded with the tape cassette;
- (d) cassette shift means responsive to full insertion of the tape cassette in the entrance opening for moving the tape cassette in its principal plane from the standby position to a data transfer position in a direction normal to the notional line, the tape cassette when in the data transfer position having the magnetic tape held against a data transfer surface of a transducer for data transfer therewith through the apertured front side of the housing of the cassette;
- (e) means for connecting the cassette shift means to the hand-operated controlled member so that the latter moves from the first to the second working position when the cassette shift means operates to move the tape cassette from the standby position to the data transfer position, the connecting means being also effective to cause the cassette shift means to move the tape cassette from the data transfer position to the standby position when the hand-operated controlled member is manually moved from the second to the first working position;
- (f) tape transport means having a pair of drive spindles movable into and out of driving engagement with the hubs of the tape cassette lying in the data transfer position, the drive spindles being out of driving engagement with the hubs of the tape cassette when the hand-operated controlled member is in the first or second working position; and
- (g) tape transport shift means responsive to the movement of the hand-operated controlled member from the second to the third working position for shifting the drive spindles into driving engagement with the hubs of the tape cassette lying in the data transfer position, and to the movement of the hand-operated controlled member from the third to the second working position for shifting the drive spindles out of driving engagement with the hubs 8. The data transfer apparatus of claim 7 wherein the cassette shift means comprises a spring-biased member for ejecting the tape cassette from the standby position when the hand-operated controlled member is moved from the second to the first working position.

* * * * *